United States Patent [19]
Burrows

[11] Patent Number: 4,528,641
[45] Date of Patent: Jul. 9, 1985

[54] VARIABLE RADIX PROCESSOR

[75] Inventor: James L. Burrows, Merrimack, N.H.

[73] Assignee: The United States of America as represented by the Secretary of the Air Force, Washington, D.C.

[21] Appl. No.: 442,212

[22] Filed: Nov. 16, 1982

[51] Int. Cl.³ .............................................. G06F 7/52
[52] U.S. Cl. .................... 364/757; 364/736; 364/749
[58] Field of Search ............... 364/757, 754, 748, 736, 364/728, 715, 749

[56] References Cited
U.S. PATENT DOCUMENTS

| | | | |
|---|---|---|---|
| 3,189,735 | 6/1965 | Gunderson et al. | 364/771 |
| 3,222,506 | 12/1965 | Meade | 364/771 |
| 3,748,451 | 7/1973 | Ingwersen | 364/728 |
| 4,152,627 | 5/1979 | Priel et al. | 315/227 |
| 4,202,039 | 5/1980 | Epenoy et al. | 364/757 |
| 4,287,566 | 9/1981 | Culler | 364/754 |
| 4,344,151 | 8/1982 | White | 364/754 |
| 4,393,468 | 7/1983 | New | 364/736 |

Primary Examiner—David H. Malzahn
Attorney, Agent, or Firm—Donald J. Singer; Stanton E. Collier

[57] ABSTRACT

A variable radix processor is constructed on 1.25 micrometer CMOS/SOS. The processor, based upon a predetermined algorithm, is constructed to process radix 2 to 7 data wherein the data is input in a parallel-by-word, parallel-by-bit format. A format selection switch has the data input whereafter a plurality of switches outputs an address format to a bit-slice multiply-adder. The bit slice multiply-adder has ROMs addressed by the format selection switch. Based upon the predetermined algorithm, each unique address format causes the ROMs to output a unique word in parallel bits to a tally cascade circuit and then to a fast-carry adder. The processor can operate on a transfer function such as $Z_A = \pm(A \pm C)$, $Z_B = B$ where $A = \Sigma a_i X_i$, $B = b_i X_i$ with very high throughput rates such as 380 million operations per second.

14 Claims, 8 Drawing Figures

FIG. 5
ROM ADDRESS BITS
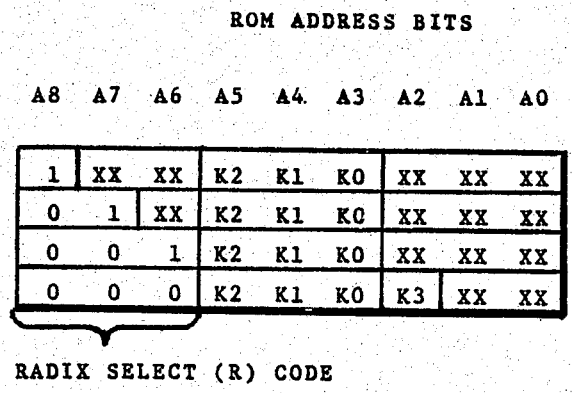
| | | | | | | | | | |
|---|---|---|---|---|---|---|---|---|---|
| A8 | A7 | A6 | A5 | A4 | A3 | A2 | A1 | A0 | |
| 1 | XX | XX | K2 | K1 | K0 | XX | XX | XX | 8 RADIX 5 COEFFICIENTS |
| 0 | 1 | XX | K2 | K1 | K0 | XX | XX | XX | 8 RADIX 4 COEFFICIENTS |
| 0 | 0 | 1 | K2 | K1 | K0 | XX | XX | XX | 8 RADIX 3 COEFFICIENTS |
| 0 | 0 | 0 | K2 | K1 | K0 | K3 | XX | XX | 16 RADIX 2 COEFFICIENTS |
RADIX SELECT (R) CODE
$K_i$ = COEFFICIENT SELECT BITS
XX = DATA BITS
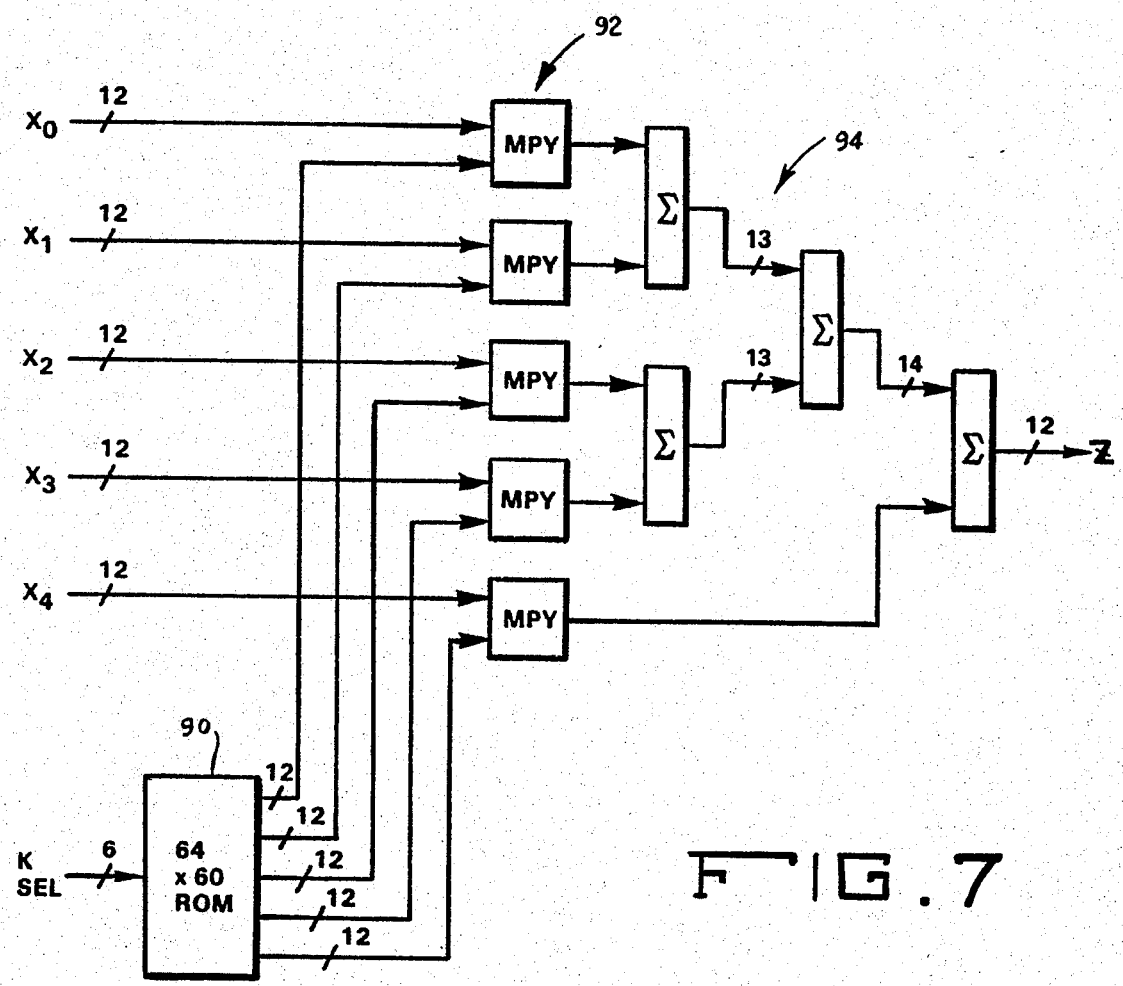
FIG. 7

VARIABLE RADIX PROCESSOR

STATEMENT OF GOVERNMENT INTEREST

The invention described herein may be manufactured and used by or for the Government for governmental purposes without the payment of any royalty thereon

BACKGROUND OF THE INVENTION

This invention relates generally to very high speed integrated circuits (VHSICs), and in particular, to a command processor having a processor chip, a memory chip, and a command chip. Further the processor provides the main computational capabilities for the command processor by performing bit-slice function table lookup, coefficient multiplication, and summation on input data samples processed in parallel in each parallel channel.

Over the past decade, there has been increasing interest in the use of ROMs as key processing elements in digital signal processors and other numerical machines. For example, the TI 'S274 and 'LS275 multiplier chips are nothing more than 256×8 ROMs programmed to perform table lookup multiplication.

It is easy to visualize how a small 256×8 ROM could be programmed as a multiplier for two 4-bit inputs to produce an 8-bit result. However, except for BCD machines, a 4-bit data format is much too small to be of practical use for digital signal processing. However, as more bits are added to the input data, the size of a simple ROM multiplier of this type more than quadruples for each bit added. For example, a 1024×10 ROM would be required to multiply two 5-bit numbers and produce a 10 bit result. Even if the size of the output word is restricted to equal that of either input by rounding, the exponential increase in ROM size with each bit added to the input argument still obtains. Furthermore, if the use of the ROM is restricted to that of a coefficient multiplier, wherein a single input variable is multiplied by one of several selectable coefficients, there is still the exponential growth problem. For example, a 32K×10 ROM would be required to multiply a 10-bit input by one of 32 selectable coefficients and produce a 10-bit, rounded result.

Clearly, if ROMs used as multipliers or any other form of numeric processing elements are to be practicable, even in the age of VHSIC, some means for limiting the word size input to each ROM, without unduly restricting the word size which can be handled by the processing system as a whole, must be employed. One approach is to use the bit-slice processing method of Peled and Liu where the size of the ROM address word is determined by the number of input words instead of the number of bits per word. While this approach has merit for some processing operations, it is not a general solution.

At first glance, the Residue Number System (RNS) based on the Chinese Remainder Theorem would seem to be a solution. Using this approach, a 16-bit input, for example, could be encoded into RNS, using ROMs, into, for example, 5 5-bit bytes and each byte could be processed independently until it is desired to decode the results into the original binary number system for display or control. Unfortunately, RNS works on integers, not fractions, and you cannot easily scale large integral results back into rounded fractions without decoding out of the RNS system, scaling in binary, and recording into RNS for further operations. There are other problems associated with RNS which make it impractical for general purpose signal processing.

These drawbacks have motivated the search for alternative techniques such as memory processing circuits and lookup tables to achieve reduced chip area per function, improved processor throughput, and reduced VHSIC design cost through the use of highly regular, memory-type chip architectures.

SUMMARY OF THE INVENTION

There currently exists, therefore, the need for a high speed low cost signal/image processor. The present invention is directed toward satisfying that need.

The main performance attribute of the command processor is high speed and high volume throughput obtained by heavy pipelining and parallelism rather than by brute speed of transistors therein as relied upon by past devices. The command processor employs memory processor and table lookup processing techniques. The command processor can perform in one memory cycle what a conventional processor required several clock cycles to complete.

The command processor of this invention includes a variable radix processor chip, a memory chip, and a command chip. In particular, the processor chip is the main computational element of the command processor with on-chip ROM sequencer, bit-slice multiply-adders, and exponent manager, organized in two channels to perform function table lookup multiplication by a selectable coefficient, summation of up to five 18-bit block floating point (12-bit mantissa, 6-bit exponent) inputs for each channel, and offset the result of either channel by adding or subtracting an independent input.

The processor chip may be programmed for a wide variety of mixed or single radix operations up to radix 9, including (1) 8 complex operations on radix 5 data; (2) 8 complex operations on radix 4 data; (3) 8 complex operations on radix 3 data; and (4) 16 complex operations on radix 2 data for a total of 40 operations using 128 complex coefficients. Higher radix operations may be performed through the parallel operation of chips with data input from separate or common (shared) memory.

The main functional elements of the processor chip are: (1) an input section; (2) a format selection switch which is used to select the mode of operation (e.g., complex operations on radix 5 data); (3) a bit-slice multiply-adder which performs the majority of the number-crunching on the chip; (4) a ROM finite state sequencer which contains the user program; (5) an exponent manager, which generates the exponent output and overflow bits; and (6) an output section.

The transfer function for the processor chip is shown by equations (1) to (4):

$$Z_A = \pm(A \pm C), Z_B = B \text{ or} \tag{1}$$

$$Z_B = \pm(B \pm C), Z_A = A \text{ where} \tag{2}$$

$$A = \sum_{i=0}^{r-1} a_i X_i, \; r = 2, 3, 4, \text{ or } 5, \text{ and} \tag{3}$$

$$B = \sum_{i=0}^{r-1} b_i X_i, \; r = 2, 3, 4, \text{ or } 5, \tag{4}$$

where $a_i$ and $b_i$ are complex coefficients for radix r computations, $x_i$ are input data samples, and C is an independent input.

The chip is implemented using memory processing techniques (e.g. ROM lookup tables) to allow for greater throughput capabilities when compared to conventional logic methods. The chip cycle time is 50 ns so that for radix 5 operations (10 multiplies and 9 adds) chip throughput is about 380 million operations per second (MOPS).

In particular, the format selector switch has a plurality of parallel switches equal in number to the number of bits in each word of the primary data channels. Each switch is a combination of NOR gates, inverters, and drivers and each outputs a number of address bits equal in number to the number of parallel words input to the bit-slice multiply-adder circuit. There are also two identical, independent bit-slice multiply-adder circuits in each processor chip corresponding in number to the data channels, for example 2. Each bit-slice multiply-adder may consist of 12 512×N bit ROMs (N varies from 3 to 15) followed by a, for example, 3-stage tally cascade and a 2-word by 15 bit adder with a 12-bit output and 2 overflow bites. This configuration accommodates parallel data operation up to radix 7.

It is therefore one object of this invention to provide for a variable radix processor that has a reduced chip area per function.

It is another object of this invention to provide for a variable radix processor that has improved throughput rate.

It is another object of this invention to provide for a variable radix processor that utilizes memory processing techniques that can process signal/image data in a parallel-by-word, parallel-by-bit manner.

It is a further object of this invention to provide for a variable radix processor that significantly reduces system and support software cost by using highly regular, memory-type chip architectures.

These and many other objects of the present invention will be readily apparent to one skilled in the pertinent art from the following detailed description of a preferred embodiment of the invention and related drawings.

BRIEF DESCRIPTION OF THE DRAWINGS

FIG. 5 is an example of a variable radix ROM address format used in the processor of this invention;

FIG. 7 is a block diagram of a radix 5 multiply-add circuit; and

DETAILED DESCRIPTION OF THE PREFERRED EMBODIMENT

Due to the strong influence from microprocessor technology, avionics digital signal processing architectures reflect the trend toward distributed processing. Distributed signal processors have generated considerable interest because of their potential for achieving higher throughput than conventional architectures and because of the inherent fault tolerance of a structure consisting of interconnected identical processing elements. Overall system cost can be dramatically reduced if functional partitioning is performed with an emphasis on the use of off-the-shelf processing equipment. Further, development and maintenance cost reductions can be achieved if the component hardware and software are selected to be similar (or even identical) from subsystem to subsystem. Hence the key aspects of any new architecture should be low design cost, high utility and great flexibility.

In order to achieve these goals, a memory processing element (PE) is developed which employs memory circuits and table lookup techniques in lieu of random logic to perform basic arithmetic operations such as add, subtract, negate, invert, multiply, etc. Memory circuits which may be employed include RAM, (P)ROM, PLAs (Programmed Logic Arrays), SLAs (Storage Logic Arrays), and MLAs (Mixed Logic Arrays). Because they employ highly regular arrays of simple microelectronic structures, they can have very high densities resulting from high transistor-to-wiring area ratios. For this reason, they are also easy to design, simulate, and verify. Since they are programmable, a memory processing macrocell can be programmed (mask, fuse, electrical) to perform a number of different processing functions. Programming algorithms are 2-dimensional which renders them easy to create, visualize, and check. They are also acceptably fast and the cycle time of the ROM multiplier, for example, matches that of the RAM memory with which it is destined to operate. Once the ROM cells are designed, they are quite easy to replicate to create a small library of ROM macrocells (e.g., a 2K×6 ROM) which can be used as standard building blocks for a great many memory processing applications. Logic arrays are much easier to design because there are only 2 basic cells (AND and OR) for the simple PLA and MLA.

Figure 1:
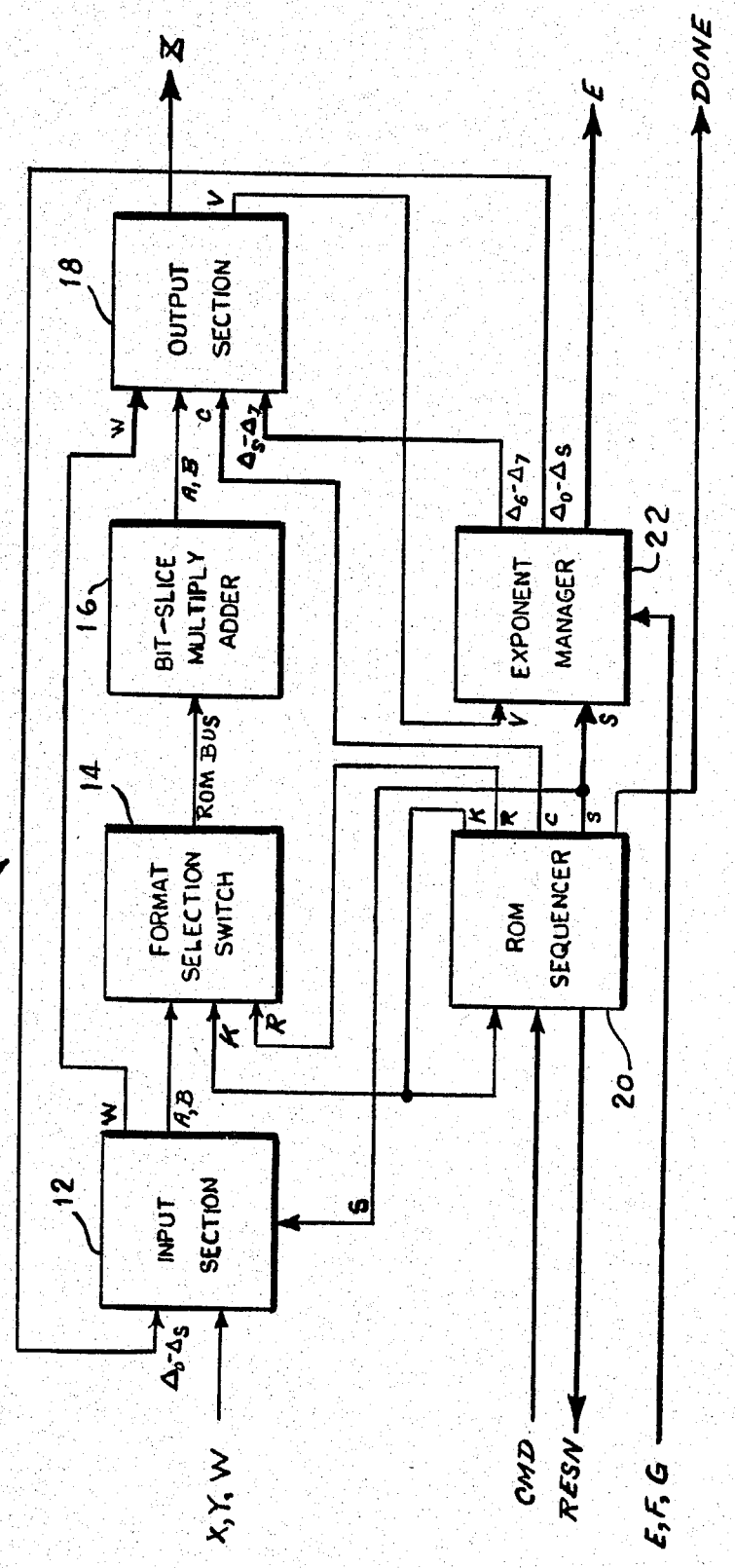
FIG. 1 is a block diagram of the command processor using the variable radix processor of this invention.

The concept of the ROM PE for the very common signal processing operation of multiplying a single input variable or multiple variables by a selectable constant leads naturally into the basic concept of a command processor 10 shown in FIG. 1. All the single lines connecting the blocks in the Figures are assumed to be in reality a plurality of parallel lines unless specifically stated otherwise. The ROM PE holds all of the coefficient multipliers required to perform a particular signal processing algorithm. Therefore, the ROM only need to be addressed by the variable and a code which selects the desired coefficient multiplier to produce the desired output. The ROM acts both as local storage of the coefficients and as the multiplying element. The need for programming coefficients, their lookup addresses in main memory, fetching and bussing the coefficients to the multiplier are all obviated.

The command processor concept is equally valid when small arrays of ROM PEs are employed for performing radix 2 operations in pipeline/parallel configurations or in high radix operations as described herein.

Command processor 10 is a digital machine which is designed to process data in response to a sequence of user defined commands. It is programmed much in the same manner as a programmable scientific calculator. Commands are executed by microcode stored in (P)ROMs configured as finite state machines. Its advantages are high speed, low design cost, and minimal software costs. Its architecture bears little resemblance to Von Neumann machines or conventional array processors in that: (1) main or "global" memory for data is replaced by small distributed local memories; (2) instruction count, fetch, decode operations are replaced by a single state transition of a finite state machine sequencer which contains all of the required commands (i.e., software); and (3) CPU is replaced by arrays of basic processing elements (PEs) and their associated state machine sequencers which contain all of the required microcode.

Command processor 10 disclosed herein has the following specific characteristics used to illustrate the principles involved: (1) 18-bit floating point data format (12-bit mantissa, 6-bit exponent); (2) 2's complement arithmetic; (3) 8-bit command code; and (4) 50 ns max processing cycle time. The implementation of other algorithms with the present invention would require different electronic configurations but these would clearly fall within the scope of the disclosed invention.

Referring to FIG. 1, command processor 10 includes an input section 12, a format selection switch 14, a bit-slice multiply adder 16, an output section 18, a ROM sequencer 20 and an exponent manager 22. The circuits of command processor 10 are shown in greater detail in FIG. 2.

In order to provide a clearer understanding of this invention and the principles involved of parallel-by-word, parallel-by-bit signal processing, particular command processor 10 is shown having a transfer function noted in equations (1) to (4) of the summary.

Figure 2:
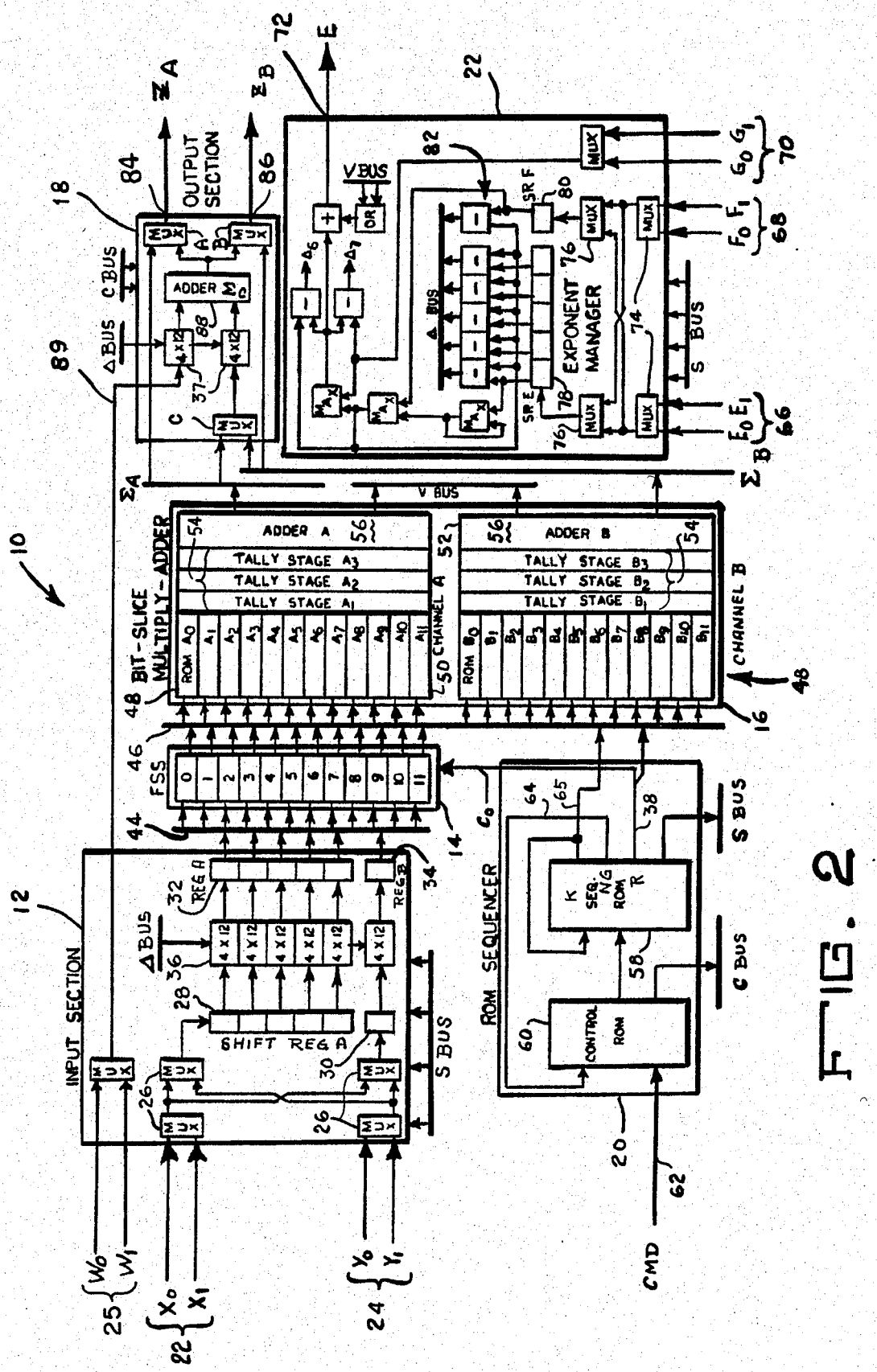
FIG. 2 is a functional block diagram of the command processor chip of FIG. 1 with the variable radix processor therein.

In particular, input section 12 of FIG. 2 has primary 12-bit data (which is a mantissa in this embodiment) input to processor 10 via an X input 22 and/or Y input 24 data ports. Auxiliary data is entered via the W input 25 port. Input multiplexers 26, X and Y, permit independent selection of either of two X sources ($X_0$ or $X_1$) and either of two Y sources ($Y_0$ or $Y_1$) as determined by control bits from ROM sequencer 20. Shift register multiplexers A 28 and B 30 permit the data to be either passed or exchanged to the corresponding shift register on each clock cycle as determined by a control bit of ROM sequencer 20. Shift register multiplexer A 28 permits up to five 12-bit mantissas to be accumulated before transfer to a register 32 for high radix operations. Shift register B 30 permits a second input to be registered simultaneously with a single input to shift register A 28 for radix 2 operations. Clearly, shift register 30 can be expanded to hold more parallel data along with modifications to process this type of signal. Transfers to a register A 32 and register B 34 are made via six 4×12-bit shifters 36, which permit each of the six input mantissas to be independently shifted up to sixteen places to the right during transfer. These shifters are controlled by an output exponent manager 22 and are inoperative (i.e., no shift is performed) when processor 10 is handling fixed point data. Thus, serial words with parallel bits are input and parallel words with parallel bits are output with appropriate shifting for floating point operations.

Figure 3:
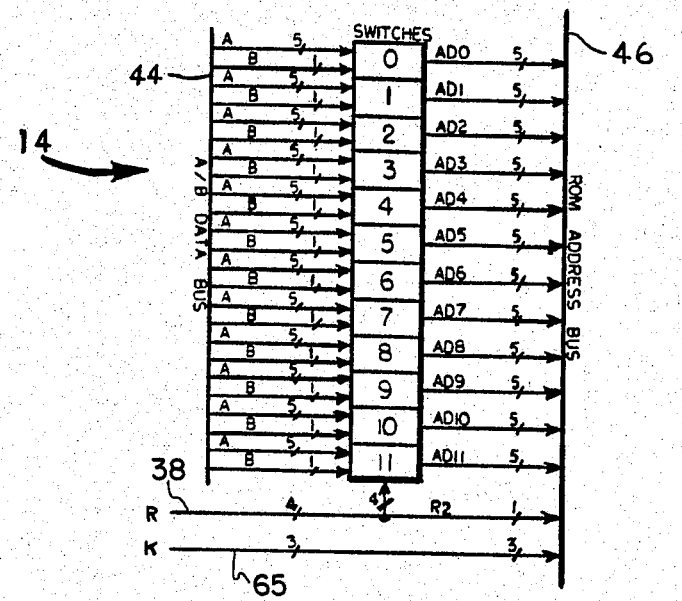
FIG. 3 is a functional block diagram of the format selection switch of FIG. 1.

The function of format selection switch 14 is to control the 9-bit addressing format of the 24 ROMs in bit-slice multiply-adder 16 in accordance with the value of three radix select bits (R) output 38 from ROM sequencer 20. FIG. 3 details a preferred embodiment of a radix 5, 12 data bit format selection switch 14, and FIG. 4 details the circuit schematic of one switch 42 of which 12 are shown in FIG. 3. Sources for the 9-bit ROM addresses are as follows: (1) 1-3 radix select bits (R) from ROM sequencer output 38; (2) 3 coefficient select bits (K) from ROM sequencer next state output 40; (3) 1 radix 2 coefficient select bit (K3) from ROM sequencer output 38; (4) 2-5 data bits (X and/or Y) from register 32 and register 34 outputs of input section 12. FIG. 5 shows one possible arrangement for an address formats as generated by format selection switch 14.

Figure 4:
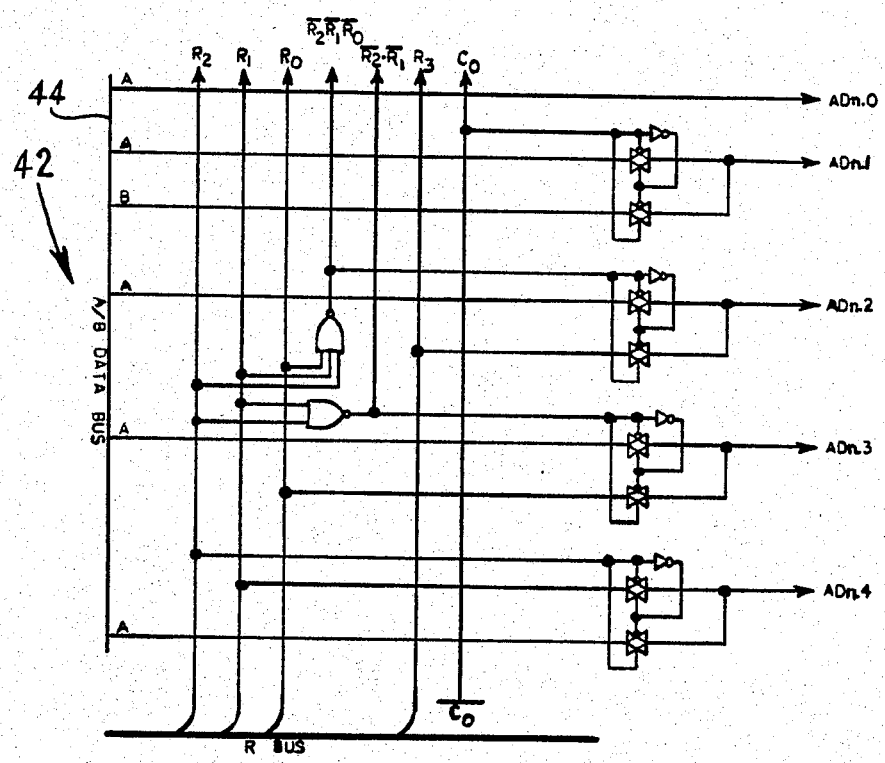
FIG. 4 is a partial schematic of a circuit for implementing one of the switches of FIG. 3.

Format selection switch 14 accepts 60 register 32 and 12 register 34 bits output via the A/B data bus 44, and 5 bits from ROM sequencer 20. Format selection switch 14 outputs 64 ROM address bits to the bit-slice multiply-adder 16 via ROM address bus 46. As shown in FIG. 3, radix select bits 38 ($R_0$, $R_1$, $R_2$) control the intermixing of data (A and/or B) and coefficient select bits 64 are fed to 24 ROMs 48 in multiply-adder 16 from ROM sequencer 20. It is further possible to input both radix select bits ($R_i$) 38 and coefficient select bits ($K_i$) 64 to format selection switch 14 as shown in FIG. 1. Output data placed on ROM address bus 46 is organized in twelve 5-bit and one 4-bit groups, corresponding to the 12 pairs of ROMs 48 which contain 5 different address bits, and $K_0$, $K_1$, $K_2$, and $K_3$, which are common for all twelve pairs of ROMs 48. (Note each ROM pair contains one channel A ROM and one channel B ROM). FIG. 4 shows an implementation that can be used for each of twelve format switches 42.

There are two identical, independent bit-slice multiply-add circuits A and B 50 and 52, respectively, in each processor 10 (corresponding to channel A and channel B). Each circuit 50 or 52 consists of 12 512×N bit ROMs 48 (N varies from 3 to 15), a 3-stage tally cascade 54 and a 2-word by 15-bit adder 56 with a 12-bit output and 2 overflow bits. This is shown in greater detail in FIG. 6. This arrangement accommodates parallel data operations up to radix 7. The ROMs 48 in channel A are programmed to output:

$$A_j = \sum_{i=0}^{r-1} a_j \cdot X_{ij}, \; r = 2, 3, 4, \text{ or } 5. \quad (5)$$

where r is the radix, j is the bit number, and $a_j$ is the coefficient for input $x_i$. Outputs are in the 2's complement number system.

Figure 6:
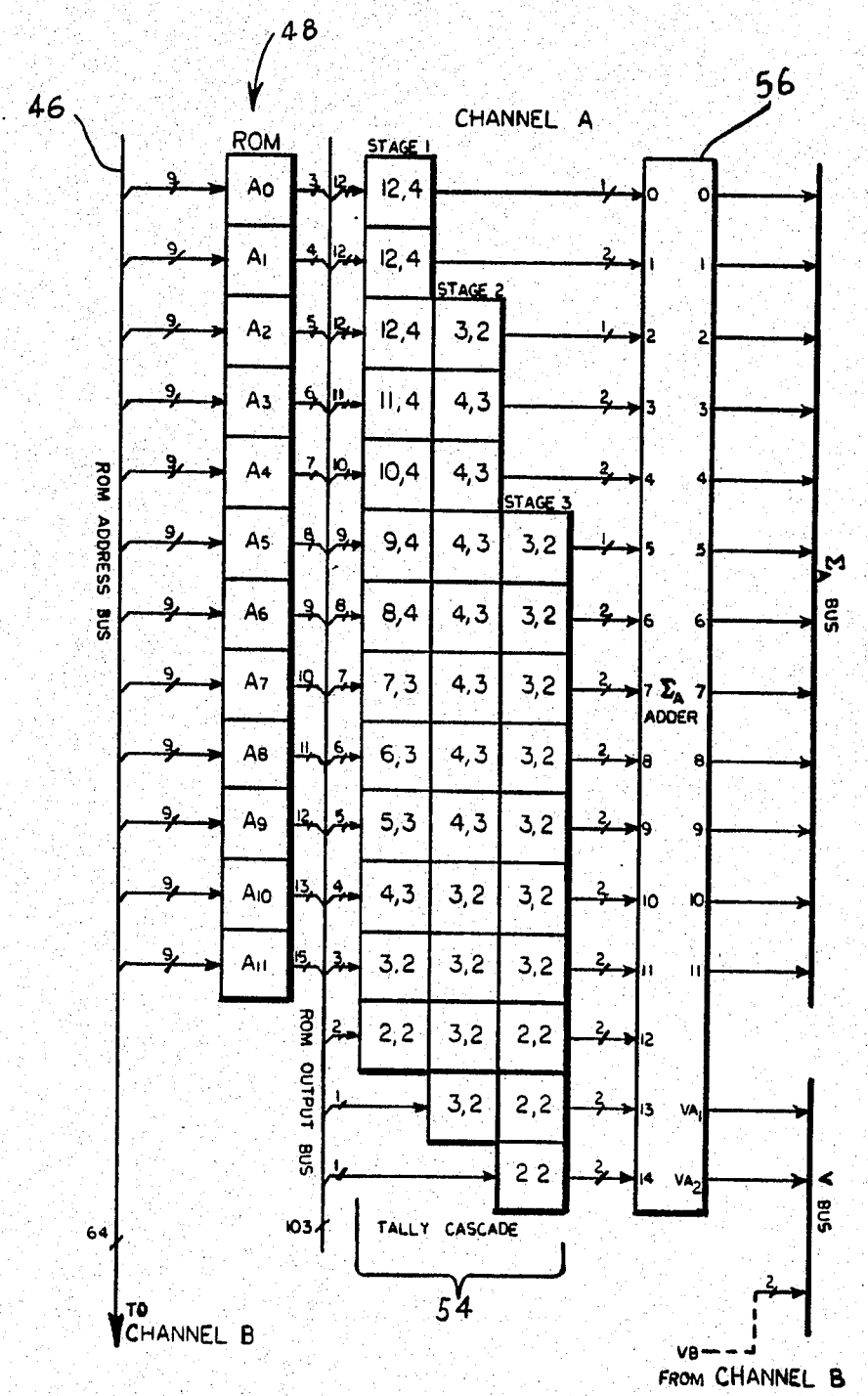
FIG. 6 is a functional block diagram of a bit-slice multiply-adder of the processor of this invention.

The number of output bits in $A_j$ is $j+3$ so that $A_0$ is a 3-bit word, $A_1$ is a 4-bit word, and so on. (Note $A_{11}$ is the exception to this as it outputs 15 bits, one extra to accommodate the sign bit). The outputs of ROMs $A_0$–$A_{10}$ are rounded in a manner selected to minimize roundoff errors and to account for the sign of each $a_i$. The output of ROM $A_{11}$ is adjusted to account for the sign of each $x_i$. These outputs are fed to a tally cascade 54 as illustrated in FIG. 6. ROM 48 outputs are tallied and shifted left until there are two or less bits of any rank so that the final summation can be accomplished by two-word fast-carry adder 56. Adder 56 automatically left justifies its output so that if output bits 11, 12, or 13 are high, which is to be expected with high radix operations, the output is right shifted until bit 10 is the most significant. The 2 overflow bits $VA_1$ and $VA_2$, indicate the number of right shifts performed and are used to adjust the common exponent accordingly. Note that channel B is identical to channel A, and that the above description can be applied to the B channel by substituting 'A' and 'a' for 'B' and 'b', respectively.

ROM sequencer 20, shown in FIG. 2, is a compound finite state machine (FSM) which is simply a FSM within a FSM. The inner FSM consists of a 512×16 sequencer ROM 58 with 8 states for each of 32 state regimes (G). Five-bit state regimes are generated by a 512×16 control ROM 60 in response to the command input (CMD) 62 and the 3-bit next regime (NG) output 64 of sequencer ROM 58 which completes the feedback loop of the outer FSM. In addition to 3-bit next-state ($K_i$) 65 and 5-bit G inputs, sequencer ROM 58 accepts a Q input bit for dynamic control of the inner FSM from a suitable programmable source such as the sign bit of the $\Sigma_c$ adder or a TIMEOUT bit from a memory chip (not shown).

The function of ROM sequencer 20 is to control the operations of processor 10 by generating: (1) up to 11 control output (C) bits which include control of the chip outputs in response to the input command 62 and the NG output 64 of the sequencer ROM 58; (2) up to five sequence (S) bits which control the chip inputs in response to present state, state regime (G), and Q bit; (3) a DONE bit when the sequence is complete; and next-state 65K bits.

Exponent manager 22 of processor 10 processes 6-bit exponents that are input to the E input 66 and/or the F input 68 ports. Input multiplexers 74 permit selection of either of two E sources and either of two F sources, similar to the A and B input ports of input selection 12. Shift register multiplexers 76 permit the exponents to be either passed or exchanged to the corresponding register on each clock cycle as determined by control bits S. Note, that up to this point, the exponent and mantissa operations are identical and synchronous. Shift register 78 and 80 permit up to five 6-bit exponents to be accumulated before transferring the mantissas to the A and B registers 82. While the exponents are being loaded into shift register E 78, exponent manager 22 determines the largest exponent, designated $EMAX_0$. $EMAX_0$ is then passed to another MAX circuit, where its value is compared to the exponent associated with any mantissa entered into register F 80. The greater of the two (designated $EMAX_1$) is then output to each of the eight 6-bit subtractor circuits to generate the differences $= EMAX_1 - e_n$. The signals are then fed to the corresponding shifters 36 in input section 12 of processor 10.

The $EMAX_1$ output of the second MAX circuit is fed to a third MAX circuit where it is compared with the G exponent associated with the auxiliary input W. Its output, $EMAX_2$ is fed to subtractors $SUB_6$ and $SUB_7$ to generate the differences $\Delta_n = EMAX_2 - e_n$, which are fed to the corresponding shifters 37 in output section 18. The $EMAX_2$ signal is also fed to a 6-bit adder where it may be incremented by the larger of the two overflow bit pairs, VA and VB, from the $\Sigma_A$ and $\Sigma_B$ adders in output section 18. The final value of the output exponent E 72 is output from the chip in synchronism with the corresponding $Z_A$ and $Z_B$ mantissa outputs, 84 and 86 respectively.

Output section 18 consists of a 12-bit adder/subtractor 88, shifters 37 and three multiplexers A, B, and C. Multiplexer C determines whether the output of the A adder ($\Sigma_A$) or the B adder ($\Sigma_B$) is to be added/subtracted to input W in accordance with control bits C. $\Sigma_C$ is computed by a twelve-bit adder/subtractor 88, with input W 89 and the output from MUX C. The function performed is determined by control bits C. Multiplexers A and B determine whether $Z_A$ output 84 will be the output of $\Sigma_A$ or $\Sigma_C$ in accordance with control bits C and whether the $Z_B$ output 86 will be the output of $\Sigma_B$ or $\Sigma_C$ in accordance with control bits C. Control bits C activate the tristate outputs of the chip.

TABLE 1

| OFFSET ADDER CONTROL BIT FUNCTIONS | | |
|---|---|---|
| C2 | C3 | Function |
| 0 | 0 | C + W |
| 0 | 1 | C − W |
| 1 | 0 | W − C |
| 1 | 1 | not used |

Analysis of signal processing algorithms and macrofunctions for radar, acoustics, comms EW, and imaging reveals that approximately half involve either a parallel sum-of-products, sums of squares, or parallel sum operations. The former include bandpass filter, beamform, correlate, FFT, FIR filter, IIR filter, and matrix filter. Furthermore, almost all of these operations involve multiplication of a vector or matrix of variables by a vector or matrix of coefficients followed by a parallel summation. For pure sum operations the coefficients are unity. For image processing this type of parallel processing is the rule rather than the exception. Since most of these parallel multiply-add operations involve multiplication of an array of data samples by a limited set of fixed coefficients, this suggests a processor chip architecture which includes roughly 5 multiply-add circuits and a built-in memory for holding the coefficients.

FIG. 7 shows a conventional implementation of a radix 5 multiply-add circuit. A ROM 90 holds 64 sets of 12-bit coefficients with 5 coefficients in each set. The 5-bit coefficient code can be generated by a finite state machine sequencer operating in response to an input command. Each set of five coefficients is fed to 5 logic multipliers 92 along with 12-bit data samples and multipliers 92 in turn drive a adder tree 94 which forms the parallel sum Z.

The choice of radix 5 instead of a radix which is a power of two or at least an even number is based on the number of basic signal/imaging processing structures which employ a radix 5 (or multiples thereof) multiply-add circuit such as second order filter, radix 9 prime factor DFT, radix 8 DFT, 9 pixel transform/processing (3×3 array), 25 pixel transform/processing (5×5 array), 49 pixel transform/processing (7×7 array), and FIR & IIR filters.

Although the function of the circuit of FIG. 7 is consistent with a command processor 10 architecture, the suggested configuration may leave something to be desired in density and speed since the estimated chip area is about 37K mils$^2$ in 1.25 μm CMOS/SOS.

Since there is about a maximum of 50K mils$^2$ active chip area for each of three command processor chips 10, this would leave, at most, only 13K mils$^2$ for I/O circuits, exponent management and, control. Therefore, there is a desire to reduce the chip area required for the radix 5 processor to about 25–30K mils$^2$. Also, in the circuit of FIG. 7 there is a three stage adder tree 94 following multipliers 92 which is both expensive in chip area and relatively slow. Although these components can be pipelined one would rather avoid the concomitant timing problems. Also, such a processing structure would not always be performing radix 5 operations and the majority of time might be spent doing radix 2, 3, or 4 operations resulting in idle hardware. Therefore, one must reduce chip area, find a faster structure, and trade something for radix size when less than a radix 5 operation is involved.

These objectives can be achieved by reducing the size of the structure of FIG. 7 by replacing adder tree 94 with a bit-slice adder. The next step would be to merge the partial produce adders in each of five multipliers 92 and the adder tree 94 into one large bit-slice tally circuit and one 14-bit adder. This will reduce total chip area to about 30K mils$^2$. A further reduction of 1.6K mils$^2$ can be realized by replacing the large 14-bit CLA adder with two small 7-bit CLA adders linked with a ripple carry which would not be noticeably slower. Now since the tally circuits comprise 80% of the remaining chip area, the next step is to cut the number of tally circuits required by replacing the AND gates with ROM lookup tables and thereby greatly reduce the number of tally circuits required to process the ROM outputs compared to those required to process the AND gate outputs. The reason for this is that 2s complement logic multipliers require a great deal of sign extension processing which approximately doubles the effective word size which the multiplier has to handle compared with an unsigned multiplier. A ROM multiplier can be programmed to provide correct answers without sign extension and can also be programmed so that single length outputs can be provided which avoid truncation and rounding errors associated with single length outputs from logic multipliers. The tradeoff, therefore, is ROM area vs tally circuit area.

Figure 8:
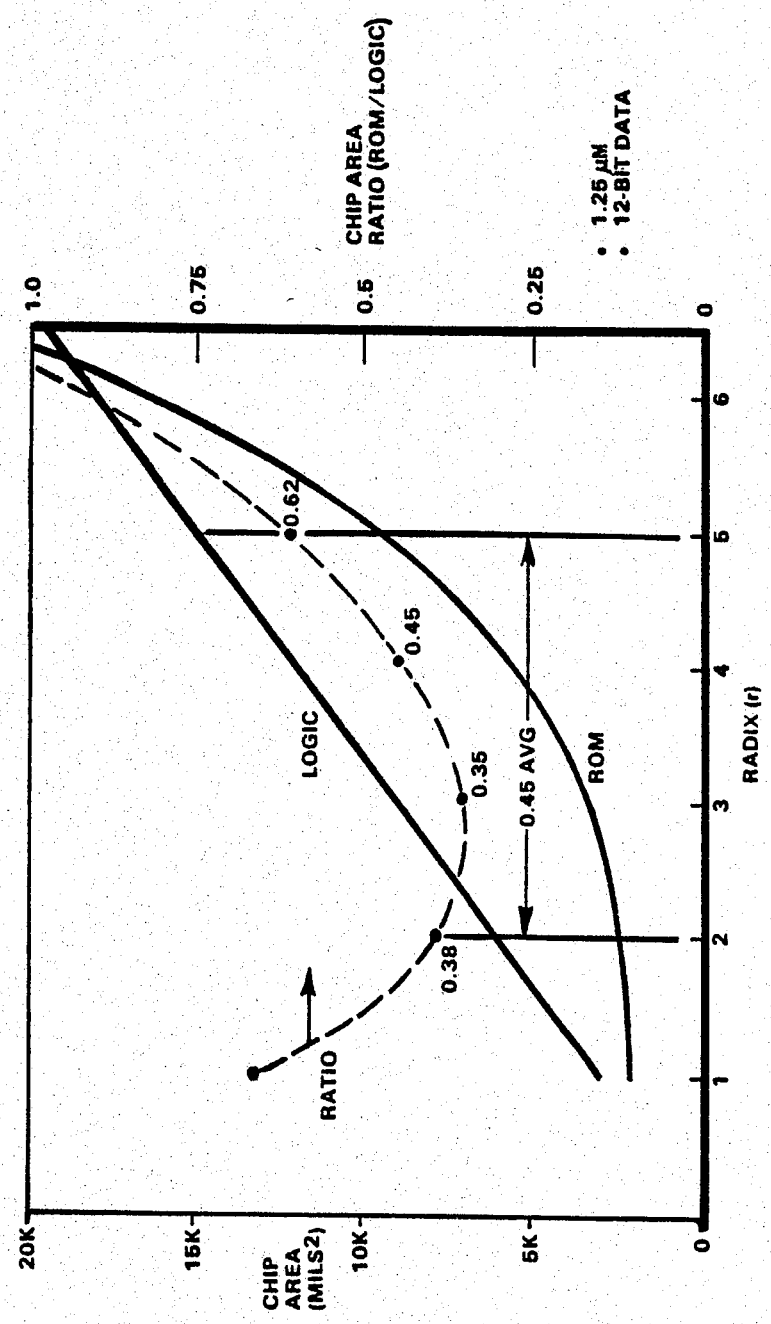
FIG. 8 is a chart showing chip area versus radix.

FIG. 8 shows quite graphically the size advantage of ROM multiply-adder circuits relative to that of conventional logic circuits as a function of radix. Although this comparison was made for 12-bit multiply-add circuits for VHSIC 1.25 μm CMOS/SOS minimum feature size the comparison is generally valid for 8–24 bit circuits in any technology. For purposes of comparison IBMs size estimate for the multiply-add circuits on their VHSIC CMAC (complex multiply accumulate chip) is compared to size estimates for the ROM version as indicated on FIG. 8. The solid curves are the 1.25 μm size estimates in mils$^2$ as a function of radix. The size of logic multiply-adder increases linearly with radix since each multiply-add circuit is independently constructed while the size of the ROM version increases exponentially because ROM size doubles for each unit increase in radix. The initial size increase with radix of the ROM version is slow because the area required for the ROM planes is low compared to that required for the tally circuits and final adder for low values of radix. However, since tally circuit size increases slowly and ROM size increases rapidly with increasing radix, the size of the ROM version increases rapidly above radix 4. The dashed curve shows the relative chip area, ROM/LOGIC, required for the two versions. For radix 3 the greatest reduction in chip area (35% of the logic version) is realized by employing the ROM approach. Between radix 2 and radix 5 inclusive it requires only 45% of the chip area on the average, and for radixes 1 and 6 there is little to choose between the two. Above radix 6 there is no advantage to be gained by employing the ROM version. The curve explains the rationale for choosing the variable radix (2–5) ROM multiply-add circuit in processor 10.

Clearly, many modifications and varitions of the present invention are possible in light of the specific teachings and it is therefore understood that within the scope of the inventive concept, the invention may be practiced otherwise than specifically described.

What is claimed is:

1. A variable radix processor for performing computations upon a plurality of variable signals in accordance with a predetermined algorithm comprising means for changing form of said plurality of variable signals input therein, each of said variable signals being composed of sequential digital words having a plurality of bits therein, said means for changing form outputting at least one output signal, each of said output signals being composed of a plurality of parallel words having parallel bits therein;

a format selection switching means for controlling a first portion of an address format, said format selection switching means including a plurality of parallel switches equal in number to the number of bits per word in said variable signals, each of said switches receiving bits of a different order from said means for changing form, said switches outputting a plurality of parallel address bits based upon said predetermined algorithm;

means for providing a second portion of said address format, said second portion including radix value select bits and coefficient select bits for said processor, said radix value select bits and said coefficient select bits being a plurality of parallel bits based upon said predetermined algorithm of said processor and a command signal input to said variable radix processor;

a bit-slice multiply-adder that has input said first and second portions of said address format from said format selection switching means and said means for providing a second portion; said multiply-adder including a plurality of multiply-add circuits, each of said multiply-add circuits being addressed by said address format, each of said multiply-add circuits including a plurality of parallel memory means equal in number to the number of bits in said word, tally cascade means and adder means, said parallel memory means having stored therein a first unique word for each of a plurality of address format values based upon said predetermined algorithm, said parallel memory means outputting said unique word to said tally cascade means, said tally cascade means outputting a tallied word to said adder means, said adder means outputting a second unique word in parallel bits for each address format value; and outputting means for receiving a plurality of unique words from said bit-slice multiply adder.

2. A variable radix processor as defined in claim 1 wherein said memory means of said multiply-add circuits is a read-only-memory (ROM), each of said read-only-memories outputting a different order bit.

3. A variable radix processor as defined in claim 2 wherein said radix value ranges from 2 to 7.

4. A variable radix processor as defined in claim 3 wherein said processor is constructed upon aproximately 1.25 micrometer complementary metal-oxide-semiconductor (CMOS)/silicon-on-sapphire (SOS).

5. A variable radix processor for performing computations upon a plurality of variable signals in accordance with a predetermined algorithm comprising:

means for changing form of said plurality of variable signals, each of said variable signals being composed of sequential digital words having a plurality of bits therein, said means for changing outputting at least one output signal, said output signal being composed of a plurality of parallel words having parallel bits therein;

a format selection switching means for controlling an address format, said format switching means including a plurality of parallel switches equal in number to the number of bits per word, each of said switches receiving bits of a different order from said means for changing, said switching means outputting a plurality of parallel bits based upon said predetermined algorithm;

means for providing coefficient select and radix select bits, said radix select bits being input into said format selection switching means based upon said predetermined algorithm of said processor;

a bit-slice multiply-adder that has input said address format, said multiply-adder including a plurality of multiply-add circuits, each of said multiply-add circuits being addressed by said address format, each of said multiply-add circuits including a plurality of parallel memory means equal in number to the number of bits in said word, tally cascade means and adder means, said parallel memory means having stored therein a first unique word for each of a plurality of address format values based upon said predetermined algorithm, said parallel memory means outputting a unique word to said tally cascade means, said tally cascade means outputting a tallied word to said adder means, said adder means outputting a second unique word in parallel bits for each variable signal received by said bit-slice multiply-adder; and outputting means for receiving a plurality of second unique words from said bit-slice multiply adder.

6. A variable radix processor as defined in claim 5 wherein said memory means of said multiply-add circuits is a read-only-memory, each of said read-only-memories outputting a different order bit.

7. A variable radix processor as defined in claim 5 wherein said radix value ranges from 2 to 7.

8. A variable radix processor as defined in claim 5 wherein said processor is constructed upon aproximately 1.25 micrometer complementary metal-oxide-semiconductor (CMOS)/silicon-on-sapphire (SOS).

9. A bit-slice, table lookup coefficient multiply-adder for computing a sum of products comprising:

means for accepting and registering a plurality of variable input signals, each of said variable input signals being a digital word having a plurality of bits, said means for accepting and registering accepting a predetermined number of said variable input signals in a first predetermined form and outputting a plurality of address signals in a second predetermined form;

memory means for performing table lookup, said memory means being selectively addressed by a bit-slice having one bit each of the same rank from each digital word of said variable input signals, said memory means having stored therein predetermined sums of one bit products for each bit-slice;

means for outputting connected to said memory means, said means for outputting a plurality of bits representing sums of one bit products; and a multibit adder connected to said means for outputting, said multibit adder summing sums of one bit products to form a complete sum of products.

10. A bit-slice, table lookup coefficient multiply adder as defined in claim 9 wherein said variable input signal is in said predetermined form of bit-parallel.

11. A bit-slice, table lookup coefficient multiply adder as defined in claim 9 wherein said variable input signal is in said predetermined form of bit-serial.

12. A bit-slice, table lookup coefficient multiply adder as defined in claim 9 wherein said memory means includes a plurality of memory devices equal in number to the number of bits in said digital word.

13. A bit-slice, table lookup coefficient multiply adder as defined in claim 12 wherein each of said memory devices has one outputting means, each of said outputting means outputting a plurality of bits representing a sum of one bit products.

14. A bit-slice, table lookup coefficient multiply adder as defined in claim 9 wherein said memory means includes additional addressing from a ROM sequencer outputting at least one bit to select coefficients from a predetermined set.

* * * * *